(12) United States Patent
Petry, III et al.

(10) Patent No.: US 7,383,536 B1
(45) Date of Patent: Jun. 3, 2008

(54) REMOTE MACHINE VISION APPLICATION PROGRAM DEVELOPMENT METHOD

(76) Inventors: John P. Petry, III, 367 Waltham St., Newton, MA (US) 02465; Cyril C. Marrion, Jr., 24 Paul Revere Rd., Acton, MA (US) 01720

( * ) Notice: Subject to any disclaimer, the term of this patent is extended or adjusted under 35 U.S.C. 154(b) by 517 days.

(21) Appl. No.: 10/640,966

(22) Filed: Aug. 13, 2003

Related U.S. Application Data

(63) Continuation-in-part of application No. 09/842,948, filed on Apr. 27, 2001, which is a continuation of application No. 09/750,173, filed on Dec. 29, 2000, now abandoned.

(60) Provisional application No. 60/403,801, filed on Aug. 15, 2002.

(51) Int. Cl.
*G06F 9/44* (2006.01)
*G06F 9/45* (2006.01)

(52) U.S. Cl. ............ 717/125; 717/100; 717/174; 717/177

(58) Field of Classification Search ............ None
See application file for complete search history.

(56) References Cited

U.S. PATENT DOCUMENTS

| | | | | |
|---|---|---|---|---|
| 5,867,322 | A * | 2/1999 | Morton | 359/619 |
| 6,025,854 | A * | 2/2000 | Hinz et al. | 345/538 |
| 6,298,474 | B1 * | 10/2001 | Blowers et al. | 717/104 |
| 6,763,515 | B1 * | 7/2004 | Vazquez et al. | 717/109 |
| 6,836,287 | B1 * | 12/2004 | Nakahara | 348/211.12 |
| 6,931,602 | B1 * | 8/2005 | Silver et al. | 715/771 |
| 7,034,825 | B2 * | 4/2006 | Stowe et al. | 345/423 |
| 2002/0055947 | A1 * | 5/2002 | Schultz et al. | 707/500 |
| 2002/0083413 | A1 * | 6/2002 | Kodosky et al. | 717/109 |
| 2004/0100465 | A1 * | 5/2004 | Stowe et al. | 345/427 |
| 2006/0053407 | A1 * | 3/2006 | Kodosky et al. | 717/105 |

OTHER PUBLICATIONS

Ho, Yeuk Fai; "Model-based image processing: Analysis, Modeling, simulation and application", Abstract, p. 1-3, retrieved from ProQuest Jun. 19, 2006.□□.*

Muscedere, Roberto; "A multiple in-camera processing system for machine vision", p. 1-3 Abstract, retrieved from Proquest Jun. 19, 2006.*

Robertson, Paul; Brady, J. Michael; "Adaptive Image Analysis for Aerial Surveillance", p. 30-36, 1999 IEEE retrieved Jun. 19, 2006.*

Rogers, Richard; Liang, Jisheng; Haralick, Robert M.; Phillips, Ihsin T.; "The ISL Document Image Analysis Toolbox", p. 18-25, 1997 IEEE, retrieved Jun. 19, 2006.*

* cited by examiner

*Primary Examiner*—Mary Steelman

(57) ABSTRACT

A machine vision system located at a user site is programmed from a remote site using a program development system connected via a LAN, WAN, or the Internet. A user application program is developed and tested from the remote location and then downloaded through the network to the machine vision system. Libraries of common software module objects are stored at both locations and used during user program development and implementation in the machine vision system.

33 Claims, 10 Drawing Sheets

REMOTE MACHINE VISION APPLICATION PROGRAM DEVELOPMENT METHOD

CROSS-REFERENCE TO RELATED APPLICATIONS

This application is a continuation-in-part application of U.S. patent application Ser. No. 09/842,948 filed on Apr. 27, 2001, which is a continuation of U.S. patent application Ser. No. 09/750,173 filed on Dec. 29, 2000 now abandoned and entitled "Remote Machine Vision Server." This application also claims the benefit of U.S. Provisional Patent Application Ser. No. 60/403,801, filed Aug. 15, 2002, entitled "Remote Machine Vision Application Development."

BACKGROUND OF THE INVENTION

The field of the invention is machine vision systems, and particularly, the development of application programs for such systems.

Computer vision, sometimes referred to as image processing, involves the extraction of vision-related information from signals representing a scene and performing image signal processing on those signals. Applications of computer vision techniques include character recognition, industrial inspection of manufactured items, robot guidance systems, radiology, remote sensing, and so on.

Implementation of a machine vision application typically involves the performance of a number of common processing steps. For example, in a first step, image acquisition is performed to acquire an image of the scene to be analyzed. The image may, for example, be represented in the form of a monochrome or simple digital image $f(x,y)$ discretized both in spatial coordinates x,y and in brightness (gray levels). Image processing techniques may then be performed on the digital image in order to improve the image and increase the chances for success in subsequent analysis processes. Such image processing techniques may include enhancing the contrast between one or more objects and the background, and filtering noise from the image. A machine vision system may have a library of software tools for carrying out such image processing functions.

After the image is enhanced it is analyzed to provide the desired information. Analysis functions can conveniently be divided into four main categories: gauging; inspection; guidance; and identification. "Gauging" involves finding parts or their edges in an image and measuring the distance between them. For example, is the gap on a spark plug within tolerance? "Inspection" is typically a check on the quality of the imaged product. For example, is the ink smeared on a label or are there defects in the surface of sheet material? "Guidance" involves accurately locating objects in a scene. For example, what is the location and orientation of a part for a robot to pick up? And finally, "identification" involves the interpretation or reading of alphanumeric characters, bar codes or two-dimensional codes. For example, a bar code fixed to a product may be scanned and identified to record the removal of the product from inventory.

In early machine vision systems it was necessary to develop an application program in a programming language such as Fortran or C to carry out each of the above steps. In more recent systems, software modules may be provided in a library and these modules are selected and linked together by the user to form an application program for performing the desired machine vision functions. In modern machine vision systems, development can be performed programmatically, or by linking vision tools in graphic form using a development environment such as VisualBasic by Microsoft, LabView by National Instruments, or VisionPro QuickStart, by Cognex Corporation. In these systems a library of machine vision tools may be provided which link together the software modules to perform image processing and image analysis functions such as:

- Histogram equalization: enhance the contrast of the scene, with some smoothing, to remove noise or for subsequent subsampling;
- Alignment: a pattern location tool that can train a pattern, search for that pattern in the scene, and provide results of that search;
- Caliper: determine the location of a single edge or the location and spacing of pairs of edges in a scene; and
- Blob: locate within a scene any two-dimensional closed shape comprised of a specific range of gray-scale values and provide information such as the number of blobs and how the blobs are topologically related to each other.

Regardless of the machine vision tool library available to the user, the development of a machine vision application program is a highly skilled activity. The application programmer must select the proper software modules and/or vision tools from the system library to accomplish the machine vision task to be accomplished, and the programmer must specify particular parameters required by each software module or machine vision tool. This requires specialized training in machine vision in general and often in the particular machine vision system being used.

Large companies that use machine vision extensively can justify hiring application programmers having the requisite skills. Smaller companies or users with a limited number of machine vision systems can obtain programming support from the machine vision system vendor or systems integrators, but such support is costly and is often the factor which economically forecloses the use of machine vision for the particular application. This is particularly true if the user's machine vision system is in a remote location and the application programmer must travel a long distance and incur living expenses while performing the task.

In addition to developing the application program for a machine vision system, that program must be maintained over a long period of time. Over time, the appearance of parts being examined may change due to changes in part design or materials, manufacturing tolerances and quality metrics may change, and environmental conditions such as lighting may change. Additionally, it may be necessary to replace or upgrade the machine vision system or components of it. These changes may affect the operation of the machine vision system and require the skills of a trained programmer to correct.

SUMMARY OF THE INVENTION

The present invention is a method and system that enables a machine vision application program to be developed at a site that is remote from the location of the image acquisition part of the machine vision system. More specifically the invention is a method for developing and/or maintaining a user application program for a machine vision system which includes: connecting the machine vision system to a network; connecting a program development system to the network; producing a user application program with the program development system; and deploying the user application program by downloading it to the machine vision system through the network. In one embodiment the user application program is compiled and sent to the user site where it is employed to operate the machine vision system. In another embodiment the user application program is employed in part by a machine vision system located remotely from the user site.

A general object of the invention is to enable machine vision application programs to be developed for remotely located machine vision systems so that skilled programmers can be located off-site. This enables machine vision vendors and system integrators to provide the services of their skilled programmers to machine vision system users located anywhere in the world without incurring travel and cost of living expenses as well as lost time due to travel. It is a further object of the invention to allow for remote application development when the machine vision system is located in a restrictive physical environment, such as a portion of a nuclear power plant that is subjected to high levels of radiation, or in a semiconductor "clean room." This enables machine vision technology to be applied in situations which otherwise might be uneconomical.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION

Figure 1:
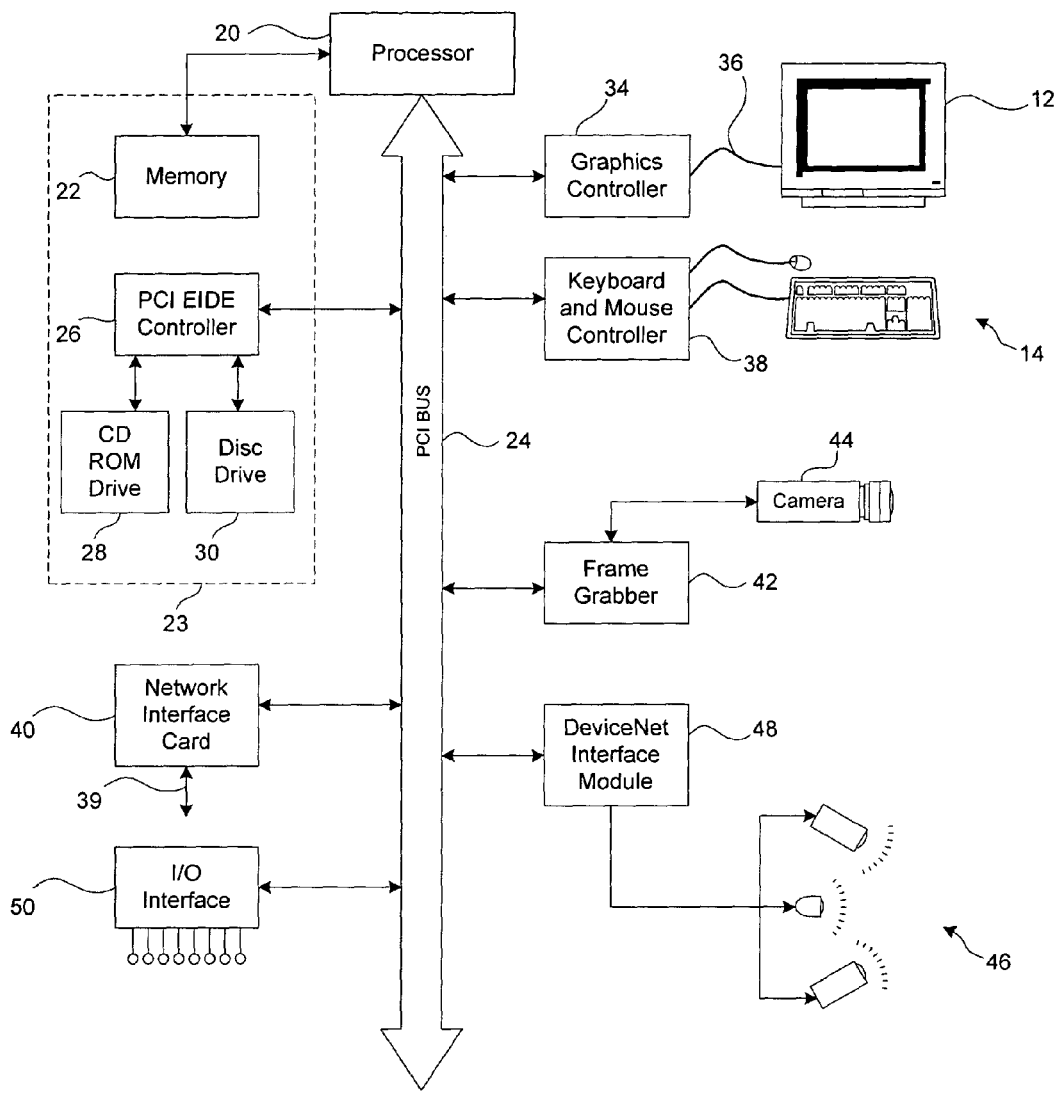
FIG. 1 is a block diagram of an exemplary machine vision system to which the present invention may be applied.

Referring particularly to FIG. 1, a machine vision system includes a processor 20 that executes program instructions stored in a memory 22 that forms part of a storage system 23. The processor 20 is a commercially available device designed to operate with one of the Microsoft Corporation Windows operating systems. It includes internal memory and I/O control to facilitate system integration and integral memory management circuitry for handling all external memory 22. The processor 20 also includes a PCI bus driver that provides a direct interface with a 32-bit PCI bus 24.

The PCI bus 24 is an industry standard bus that transfers 32-bits of data between the processor 20 and a number of peripheral controller cards. These include a PCI EIDE controller 26 which provides a high-speed transfer of data to and from a CD ROM drive 28 and a disc drive 30. A graphics controller 34 couples the PCI bus 24 to a CRT monitor 12 through a standard VGA connection 36, and a keyboard and mouse controller 38 receives data that is manually input through a keyboard and mouse 14.

The PCI bus 24 also connects to a communications network 39 through a network interface card 40. The network 39 may, for example, be a hardwired local area network (LAN), a wide area network (WAN) or the Internet, and the network card 40 provides the required physical and data link layer protocols for that network. The network 39 may alternatively include wireless communication over an IEEE 802.11(a) or 802.11(b) network. In the preferred embodiment the network interface card links to an IEEE 802.3 local area network (Ethernet) 39 which in turn connects to the Internet via a modem (not shown) or gateway (not shown). It should be apparent to those skilled in the art that other personal computers may be used to practice the present invention.

A frame grabber 42 connects the PCI bus 24 to a camera 44 or a set of cameras that provide the capability like that of a sensor to acquire information about a scene. There are many commercially available products that may be used to input image frames from the camera 44 and control the operating parameters of the camera 44. One such frame grabber is described in U.S. Pat. No. 6,025,854, issued Feb. 15, 2000 and entitled "Method And Apparatus For High Speed Image Acquisition" which is hereby incorporated herein by reference. The number of configuration parameters required to set up the camera 44 and the frame grabber 42 for a particular machine vision application will vary considerably. To enhance the operation of the present invention as many of these settings as possible should be under software control. As will become apparent from the description below, this enables the configuration of the camera 44 and frame grabber 42 to be performed by an application programmer located at a remote site.

Proper lighting of the scene to be imaged by the camera 44 is an important factor in each machine vision application. In the preferred embodiment one or more lights 46 are connected through an interface module 48 to the PCI bus 24. The lights 46 are sold commercially by Cognex Corporation and the Device Net protocol is employed to enable precise software control of their operation to meet the specific lighting needs of the particular machine vision application. Once they are mounted in place and connected, the configuration of the lighting provided by lights 46 may be performed by a remotely located application programmer. Some framegrabbers are also capable of connecting directly to the lights. This lighting arrangement also allows configuration of the lighting by a remotely located application programmer.

The machine vision system also includes an I/O interface module 50. The module 50 provides inputs from various types of devices such as pushbutton switches, photoelectric switches, and limit switches that may be used to initiate machine vision tasks. The module 50 also provides electrical outputs for signaling other systems such as programmable logic controllers or robot controllers. Such outputs can also be used to operate motors, which control the positioning or focus of the camera 44 or positioning of a pallet that supports an object to be inspected. Development of a machine vision application may involve the software control of the I/O interface 50 to properly aim the camera 44 or position an object for inspection, as well as signal other devices or systems that particular events have occurred. For example, the application might sense the arrival of an object to be examined by the closure of a limit switch, position the camera 44 or a pallet transporting the object to properly align the object in the field of view of the camera, and signal a programmable logic controller if the object fails the visual inspection. One skilled in the art will appreciate that many framegrabbers are also capable of providing the I/O capability just described.

Traditionally, an application programmer employs the keyboard and mouse 14, the CRT monitor 12 and application development software in storage 23 to develop a machine vision application program. This machine vision application program is then stored in the storage 23 and executed by the processor 20 to carry out the prescribed functions. This application programming process includes acquiring images, processing them in some manner and observing the results of applied vision tools. The camera operation and lighting may require changing to improve results and the operating parameters of the selected vision tools may require adjustment. This is a highly interactive process, which requires much information from the site of the camera 44, and/or the machine vision system.

Figure 2:
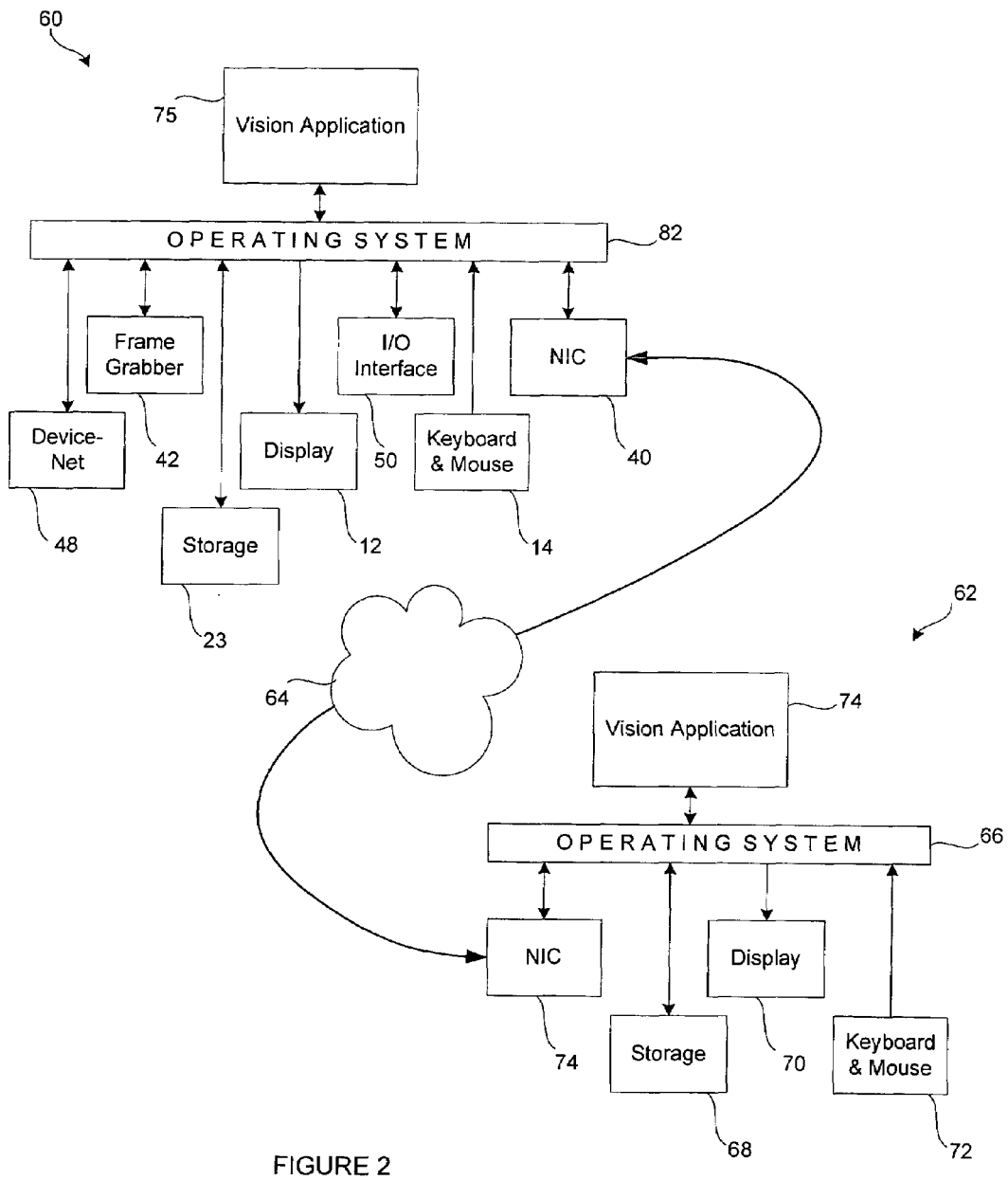
FIG. 2 is a block diagram of the software elements of the machine vision system of FIG. 1 connected to a remote application program development system.

The present invention enables the machine vision application programming process to be carried out from a remote site. Referring particularly to FIG. 2, the local machine vision system indicated generally at 60 is connected to a remotely located application program development system indicated generally at 62. The remotely located application development system 62 can be in the form of any COM-compliant language development environment, such as VBScript from Microsoft Corporation, LabView from National Instruments, or VisionPro QuickStart from Cognex Corporation, or development environments such as ANSI C, Visual C++, Visual Basic, etc. The two systems 60 and 62 are connected by a LAN, WAN or the Internet which is indicated at 64, or a dedicated peer-to-peer connection. Like the machine vision system 60 described above, the application program development system 62 is a workstation compatible with a Microsoft Corporation operating system indicated at 66, and it includes storage 68, a display 70 and a keyboard and mouse 72. A network interface card (NIC) 74 connects the application program development system 62 to the connecting network 64. As will be described in more detail below, the application programmer uses these system hardware elements and a stored vision application program 74 to produce a vision application program 75 for the machine vision system 60.

Figure 3:
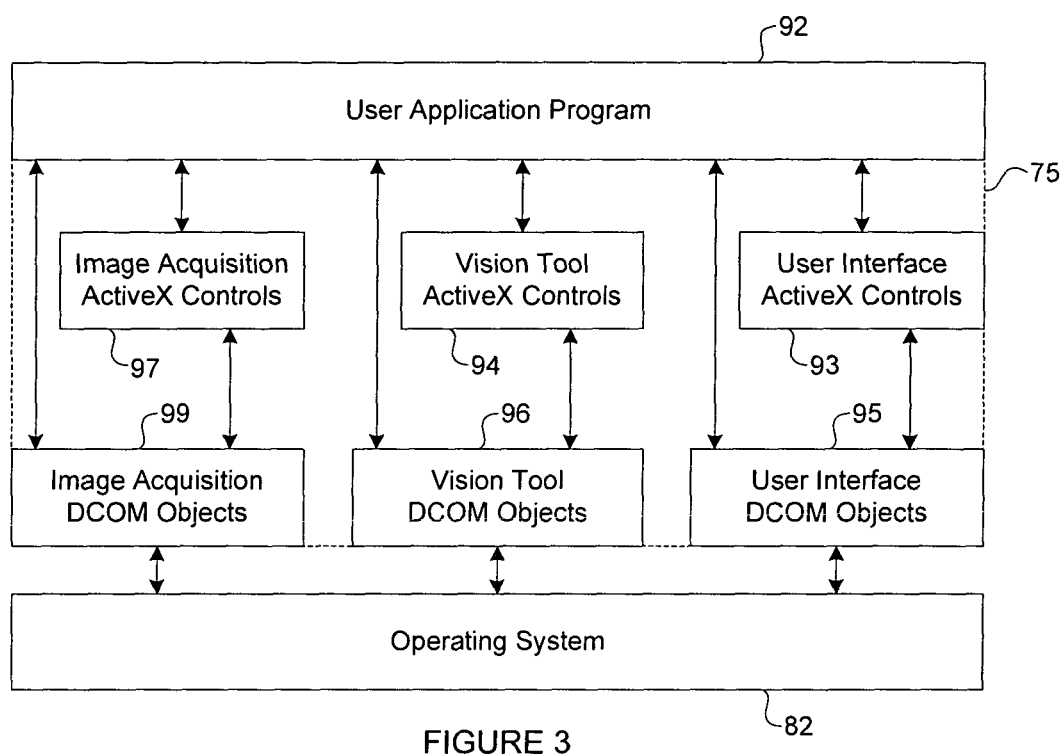
FIG. 3 is a block diagram of a vision application which forms part of the local machine vision system in FIG. 2.

The software architecture of the vision application 75, which is to be developed according to the present invention, is shown in FIG. 3. The vision application 75 is an object-oriented software program which employs a stored library of vision tool ActiveX controls 94 and vision tool objects 96 to carry out specific tasks directed by the user application program 92. Each vision tool object 96 is a self-contained coded software module that provides some service to other objects 96. The objects 96 comply with the Distributed Component Object Model (DCOM) standard which enables them to not only work with other objects in the machine vision system 60, but across the network 64 with objects in the development system 62 using TCP/IP protocols. The DCOM standard is described in a white paper available on the Microsoft Corporation website.

DCOM is a protocol that allows COM objects to communicate across machine boundaries. Applications can only truly access an object that is located in the memory of the machine running the application. An application that wants to access an object on a remote machine does so thru a proxy object that lives on the local machine. A proxy object is just a lightweight object that knows how to delegate requests by communicating over the network to the actual object on the remote machine. The DCOM objects 99, 96, and 95 shown in FIG. 3 can be proxy objects or actual objects.

The vision tool DCOM objects 96 employ the operating system 82 to operate the machine vision system hardware elements to carry out their tasks. The vision tool DCOM objects enable one to process an image, or to analyze the image and provide results of that analysis. The vision tool Activex controls 94 are GUI components that make it easy to configure the vision tool DCOM objects 96. Exemplary vision tools are:

PMAlign. This is a pattern location tool that can train a pattern, search for that pattern within an image, and provide results of that search. The PMAlign tool can account for changes in the pattern's location, rotation, or scale from image to image, as well as define the search region within the image or the number of instances of the pattern to search for.

Caliper Tool. Determines the location of a single edge or the location and spacing of pairs of edges in an image.

Blob Tool. Locates within an image any two-dimensional closed shape, or blob, that is composed of a specific range of gray-scale values. The blob tool can provide information such as the number of blobs and how blobs are topologically related to each other. Blob analysis can be useful in applications that have high-contrast images or that concern presence/absence detection, such as finding solder blobs or ink spots on a surface.

The vision tool ActiveX controls 94 are "controls" which are modular software components that provide a GUI (graphical user interface) for the vision tool DCOM objects 96. The controls make it easy for humans to configure the vision tool DCOM objects 96. They are typically written in Visual C++, Visual Basic or Java. Each vision tool DCOM object has properties, events and methods specific to the task it performs which are collectively known as the vision tool's interface. It is through this interface that the controls 94 or a user application program 92 configures the vision tools 96 and links them together to perform a series of tasks that carry out the desired machine vision functions.

The client vision application 75 also includes a set of user interface controls 93 and associated user interface DCOM objects 95. The higher level user interface controls 93 perform functions such as the following exemplary controls:

Line Control: Produces a line graphic on the display.

Display Control: This is an image display window that can be used to display any image or various graphics.

Tool Display Control: Like the Display Control, this can be an image display window. However, the Tool Display Control displays the images, graphics, and/or configuration parameters of a vision tool.

The vision application 75 also includes a set of image acquisition controls 97 and associated image acquisition DCOM objects 99. The image acquisition DCOM objects 99 operate the frame grabber 42, camera 44 and the lighting 46 and receive image data from the frame grabber 42. The higher level image acquisition controls 97 allow users to easily configure the image acquisition DCOM objects 99.

The image acquisition DCOM objects perform functions such as the following exemplary functions:

AcqFifo Control: Acquire an image from the frame grabber and camera.

Image File Control: Read and save image files.

Lighting Control: Operates one or more lights to illuminate the imaged scene

Camera Control: Image acquisition instructions, exposure time, video lines to read, gain and offset parameters of the camera.

Camera Position Control: Directs the orientation and zoom of the camera.

The controls 93, 94 and 97 are used during program development because they provide an easy-to-use graphical user interface (GUI) that makes them easier to use when developing an application program. The vision tool controls 94, for example, include a tool display window that displays the images associated with the underlying tool. A local tool display window is docked on the right side of a vision tool control, and one can open additional "floating displays" with a control button. For example, the PMAlign control has images of the trained pattern, the current search image, and the most recently searched image. Within the tool display window, one can graphically specify the region of interest. When the PMAlign control displays the image containing the training pattern, one can specify whether all or part of the image becomes the training pattern, or whether graphics illustrating coarse or fine training features are displayed. The vision tool controls 94 also include control buttons that run the tool instantaneously, run the tool automatically when certain parameters change, open floating tool display windows, load or save the tool's state, or reset the tool. They also may have a series of tabs that provide easy access to the underlying tool's properties and methods. For example, the PMAlign control has a Train Params tab where one can select the train algorithm and set other pattern training parameters. Other tabs specify the tool's run parameters, display the results of a pattern search, and specify the features to display in the PMAlign control's images. These controls 93, 94, and 97 can also be used in the final deployed application to give users an easy way to configure the underlying DCOM objects 95, 96, and 99.

Referring to FIG. 3, one can write the user application program 92 using DCOM objects 95, 96 or 99, vision tools controls 94, user interface controls 93, image acquisition controls 97, or a combination of any of these components. The user application program 92 can be written interactively through ActiveX controls, or programmatically through ActiveX controls or programmatically through DCOM objects.

Using controls 93, 94, 97 lets one write applications quickly and with a minimum of code. Controls are also useful for rapid prototyping. Controls are used to test and configure individual vision tools to solve a portion of the vision application. After the user application program is developed and tested, one can replace controls 93, 94 or 97 with one's own user interface code, if desired.

The user application program 92 is prepared according to the present invention on the remotely located application program development system 62, as shown in FIG. 2. For example, the machine vision system 60 may be located in a factory where it inspects and reports on products being manufactured, whereas the development system 62 may be located at a consulting firm or machine vision company in another state or country. In this embodiment the development system 62 downloads, or deploys, the compiled user application program 92 to the machine vision system 60 after it is developed. The machine vision system 60 may then operate in a "stand-alone" mode using the downloaded user application program. When operated in the stand-alone mode, the machine vision system 60 may be disconnected from network 64.

Figure 9:
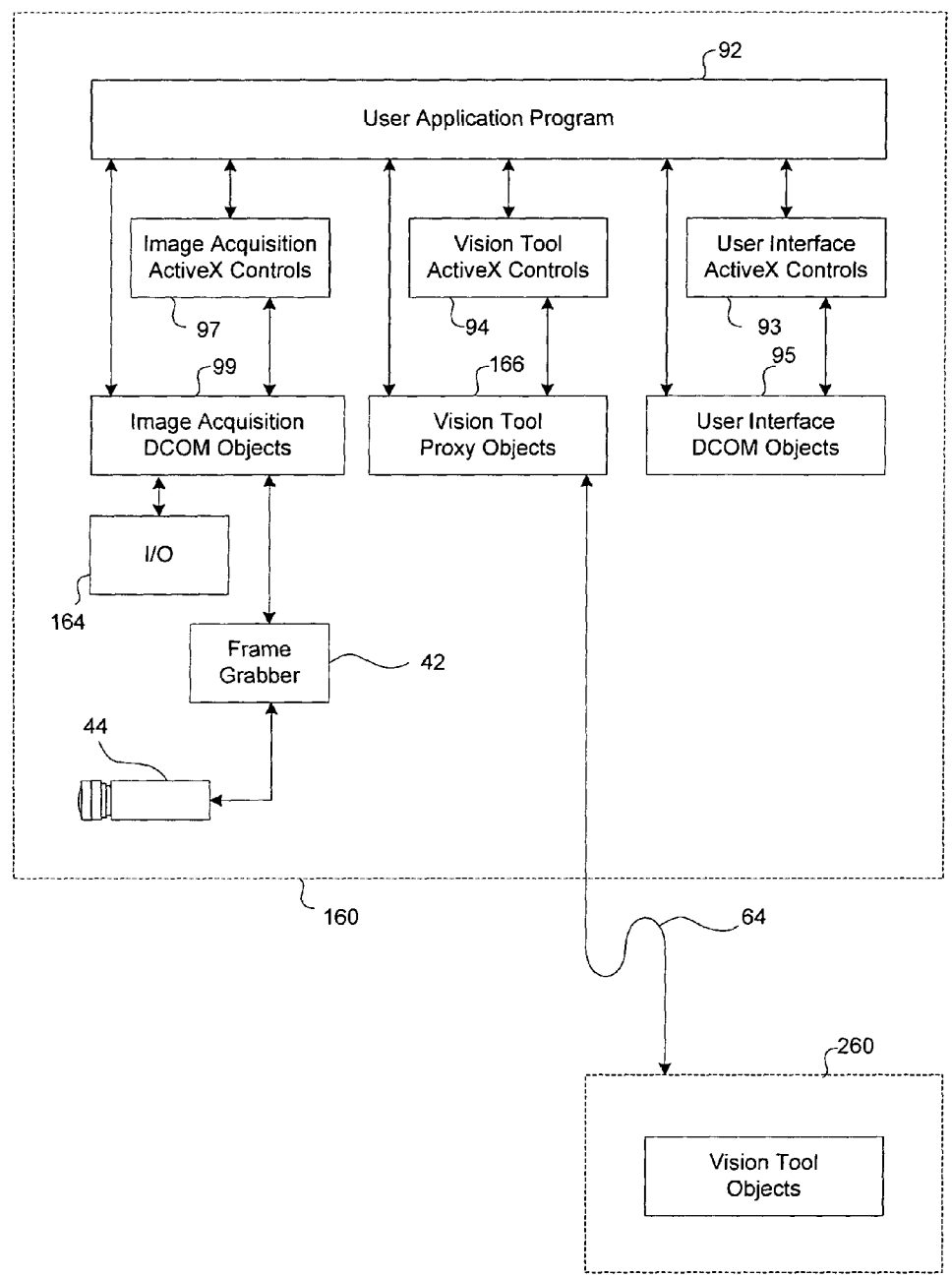
FIG. 9 is a diagram illustrating the deployment of the developed user application program in the alternative, server mode, arrangement of FIG. 6.

As will be described in more detail below, in an alternative embodiment the user application program 92 may be deployed to the machine vision system 60, but portions thereof may be performed through proxy objects and proxy controls by off-site servers. In this "server mode" of operation the machine vision system is connected to the network and operates as a client for the machine vision functions performed on the off-site server as shown in FIG. 9. In this case, the above described DCOM protocol is used. The client machine vision system 160 acquires images, using DCOM to operate vision tools on the server machine vision system 260. The client machine vision system 160 makes any necessary decisions, including further machine vision operations, setting I/O 164, or displaying resulting data on a GUI, according to the user application program 92. Similarly, the development system 62 can be operated remotely, as described in U.S. patent application Ser. No. 09/842,948, incorporated by reference herein.

Figure 4:
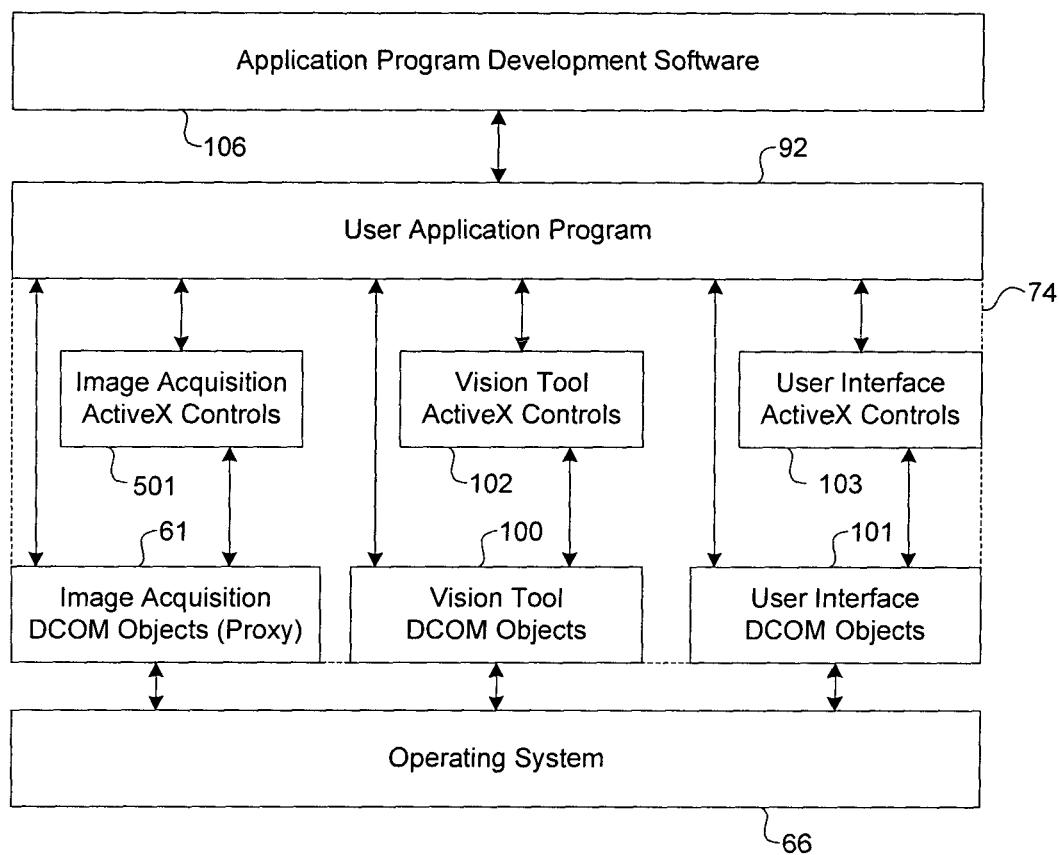
FIG. 4 is a block diagram of the software elements of the remote application program development system in FIG. 2.
Figure 7:
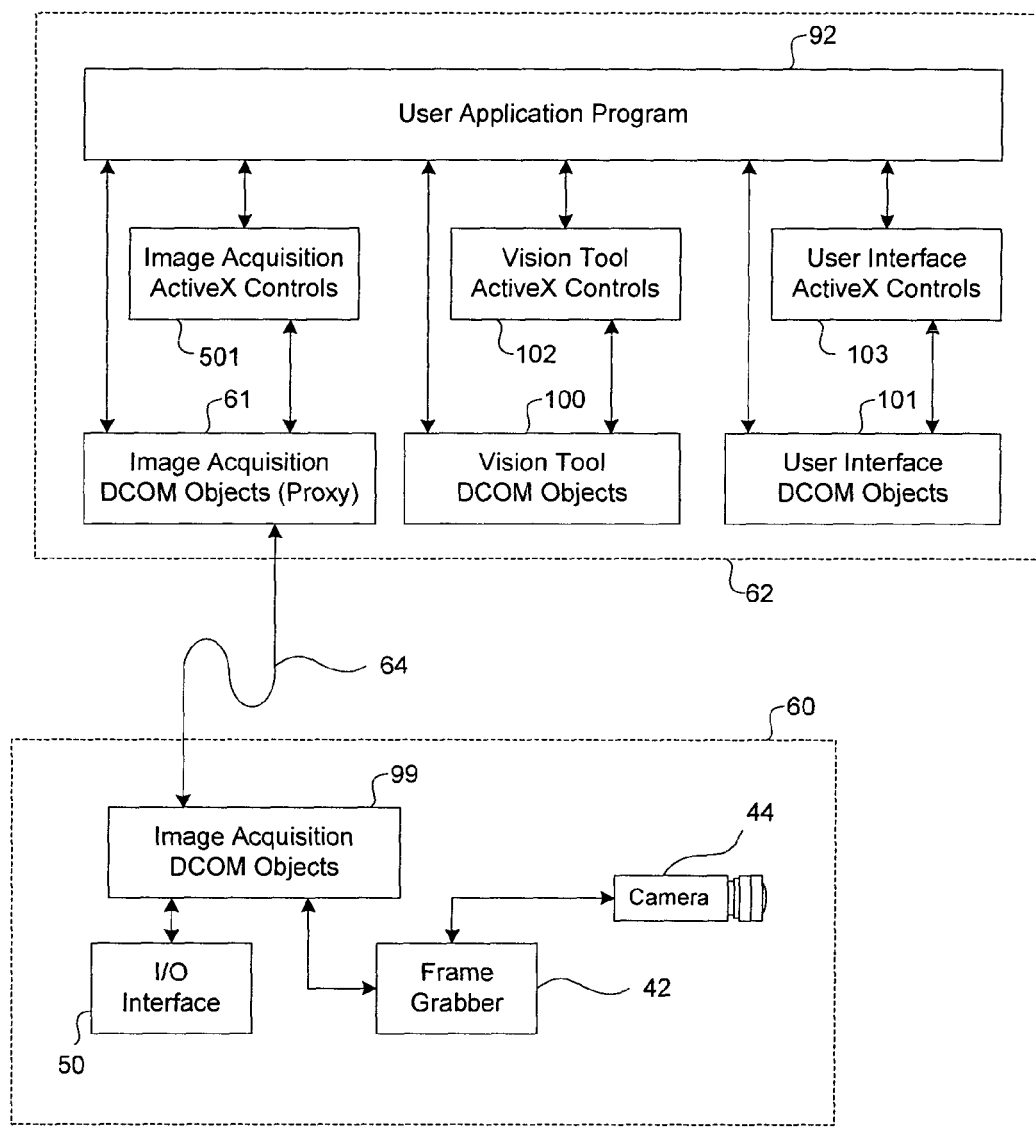
FIG. 7 is a diagram illustrating the deployment of system elements during the development of a user application program at the remote application program development system.

Referring to FIG. 4, application program development software 106 enables a programmer on the development system 62 to remotely develop a user application program 92 for the local machine vision system 60. Using this software 106 the programmer is able to interactively select and link controls 501, 102, and 103 with DCOM objects 61, 100, 101 to form a user application program 92. When the program under development is run at the development system 62, selected and linked controls and objects designated by the program may be run at the machine vision system 60 via the network 64. As illustrated in FIG. 7, the image acquisition functions are performed by image acquisition DCOM objects 99 at the machine vision system 60 under the direction of corresponding proxy object 61 at the development system 62. The machine vision processing and analyzing functions are performed by vision tool ActiveX controls 102 and vision tool DCOM objects 100 at the development system 62 with user interface functions performed by the user interface controls 103 and user interface DCOM objects 101 at the development system 62. The programmer can designate that a DCOM object's functionality is to be performed "locally" or "remotely", and when it is to be performed remotely, a LAN, WAN or Internet address is provided for the DCOM object. As will be described below, when the user application program has been completed and deployed to the machine vision system 60, these designations local/remote may be changed to properly reflect the location of the program components relative to the executing user application program.

Figure 5:
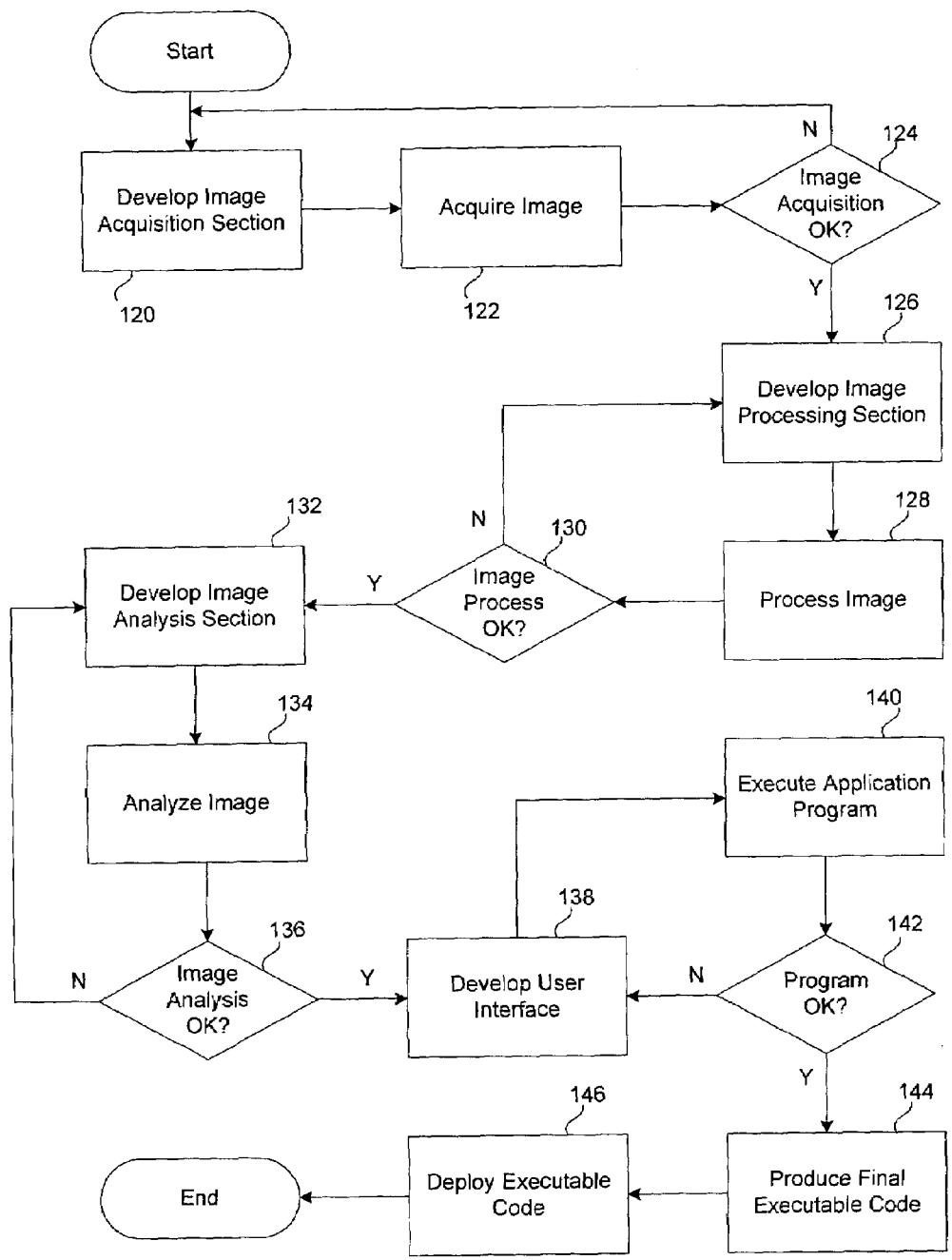
FIG. 5 is flow chart of the application program development software that forms part of the server vision application of FIG. 4.

Referring particularly to FIG. 5, the application program development software 106 enables the programmer to perform the series of steps. While these steps are shown in a specific order, in fact the steps may also be performed in a different order depending on the practices of the programmer. Also, not all these steps need be performed. For example, a particular application may not require an image processing function.

The first step, illustrated at process block 120, is to develop an image acquisition section of the user application program 92. The programmer selects image acquisition controls 501 and DCOM objects 61 to perform such functions as control the lighting 46 and camera 44 and to acquire an image by operating the frame grabber 42. The selected controls and DCOM objects are configured for the application through their respective interfaces.

The image acquisition section is then tested by acquiring an image as indicated at process block 122 and observing the result. This is done by running the new program which uses configured image acquisition controls 501 and DCOM objects 61 and directs the execution of the selected acquisition function on DCOM object 99 on the machine vision system 60. The result of such execution, (i.e., an image), is returned to the development system 62 where it can be examined by the programmer. If the acquired image is not satisfactory, as determined at decision block 124, the programmer makes changes to the image acquisition section of the program and the testing is repeated.

After the image acquisition section is developed, an image processing section of the user application program may be developed as indicated at process block 126. As described above, image processing functions prepare the acquired image for analysis and include such functions as enhancing the image contrast, enhancing edges of objects and filtering out noise. Such functions are performed by selecting, linking and configuring one or more vision tool controls or vision tool DCOM objects. The developed user program is then tested by processing an acquired image as indicated at process block 128. In most cases this testing is performed on the development system 62 using vision tool controls 102 and vision tool DCOM objects 100 stored in the libraries of the development system 62, although it could be remotely on the machine vision system 60. If the result is satisfactory as determined at decision block 130, the programmer proceeds to the next step. Otherwise, the processing section of the program is revised and the testing is repeated as necessary.

The next step is to develop the image analysis section of the user application program as indicated at process block 132. As with the previous sections, this is accomplished by selecting, linking and configuring vision tool controls and vision tool DCOM objects. The resulting program is tested by analyzing an image as indicated at process block 134, and as with the processing section of the user program, this is usually done using components stored at the application development system 62. If the image analysis functions are performed satisfactorily, as determined at decision block 136, the programmer advances to the next step. Otherwise, changes are made and the testing is repeated as necessary.

The final section of the user application program is the user interface. This is developed as indicated at process block 138 by selecting, linking and configuring the appropriate user interface controls and user interface DCOM objects. The resulting program is then tested by running it as indicated at process block 140 to determine if it is operating as expected. The user interface may include controls and DCOM objects which are executed on the development machine vision system 62 in the case of human interface functions, and it may include controls and DCOM objects which are executed on the machine vision system 60 in the case of machine interface functions, as illustrated in FIG. 7. Modifications to the user application program are made and testing repeated until it is operating correctly as determined at decision block 142.

As indicated at process block 144, after the user application program has been developed and tested, it is compiled to produce the final executable code. The locations (i.e., local or remote) at which the controls and DCOM components are to be executed are changed to reflect how the user application program is to be deployed and then the source code is compiled to machine code which is executable by the target system, or systems. In the preferred embodiment, for example, the entire compiled user application program is deployed on the machine vision system 60 and all controls and DCOM objects are executed "locally".

Figure 8:
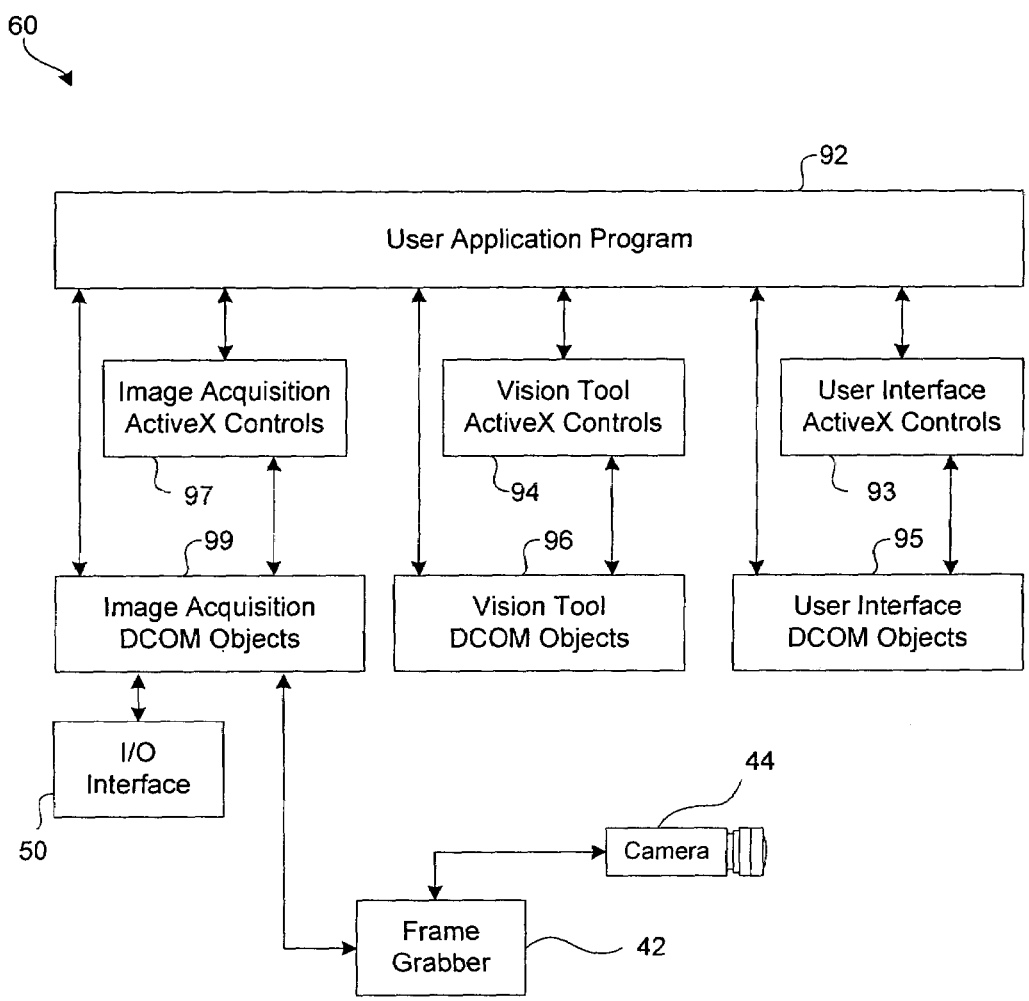
FIG. 8 is a diagram illustrating the deployment of the developed user application program in the machine vision system when operated in a stand-alone mode.

The final step is to deploy the executable code to the machine vision system 60 as indicated at process block 146. This may be accomplished by downloading the executable code via the network 64 to the machine vision system 60 as a user application program file. Since the controls and DCOM objects used by the executable code are already stored at the machine vision system 60, the size of this download file is minimal. The resulting stand-alone machine vision system that results is illustrated schematically in FIG. 8. In this preferred stand-alone mode of operation the customer machine vision system 60 has all the hardware and software elements necessary to carry out the functions directed by the completed user application program 92. It may be disconnected from the network for normal operation, but may be reconnected for maintenance or updating from a remote site.

Figure 6:
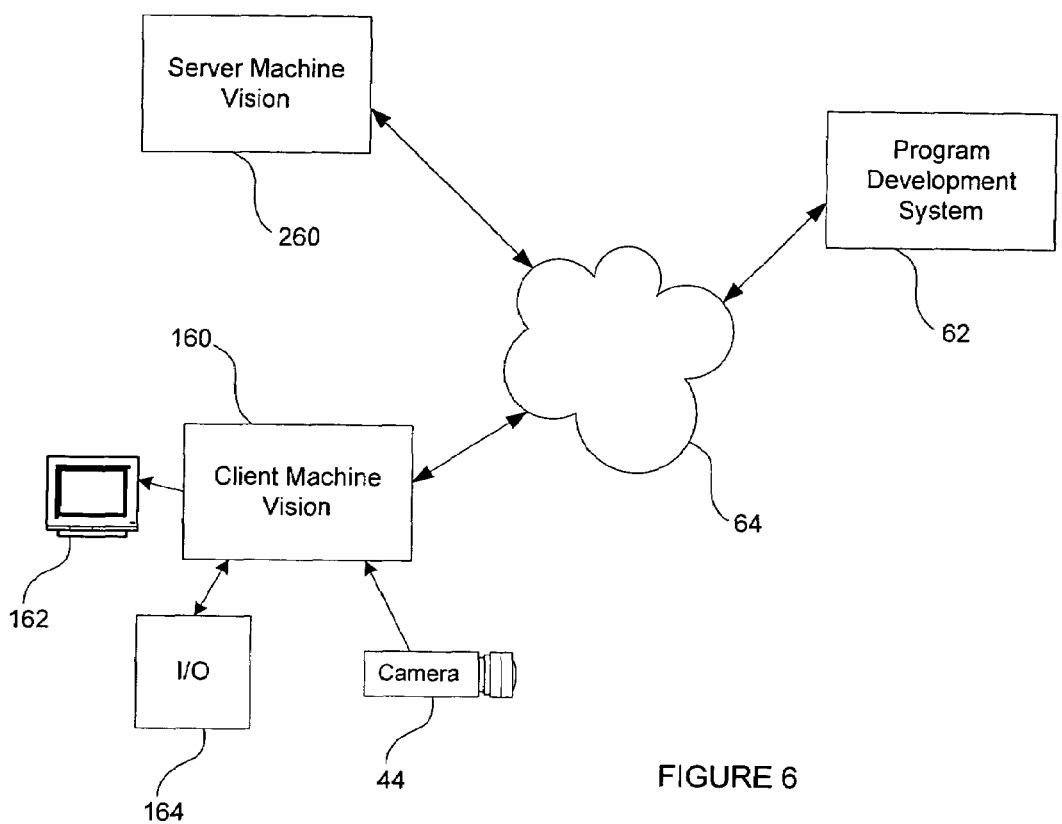
FIG. 6 is a block diagram of an alternative machine vision system arrangement.

As shown in FIG. 6, other deployment arrangements are also possible. In this second embodiment the machine vision system 60 is located at two different places and they are connected together in a server/client relationship via the network 64. The client machine vision portion 160 is located with the camera 44 and it may include user interface devices such as a display 162 and connections to devices that provide input signals or receive output signals as indicated at 164. As illustrated in FIG. 9, the client machine vision portion 160 executes the developed user application program 92 and it performs the image acquisition functions and user interface functions of the machine vision system using the DCOM objects 95 and 99 and controls 93 and 97. The vision tool objects, however, are executed on the server machine vision portion 260 through vision tool proxy objects and controls 166.

The server machine vision portion 260 may be located in the same plant, at a central location for the company that operates the plant, or at a service provider such as a systems house or machine vision vendor. The server machine vision portion 260 performs the image processing and image analysis functions. Its libraries contain the vision tool DCOM objects used to perform these functions. The compiled user application program 92 is deployed to the client machine vision portion 160, which uses the "remote" DCOM objects at the server machine vision portion 260 to carry out its functions.

Figure 10:
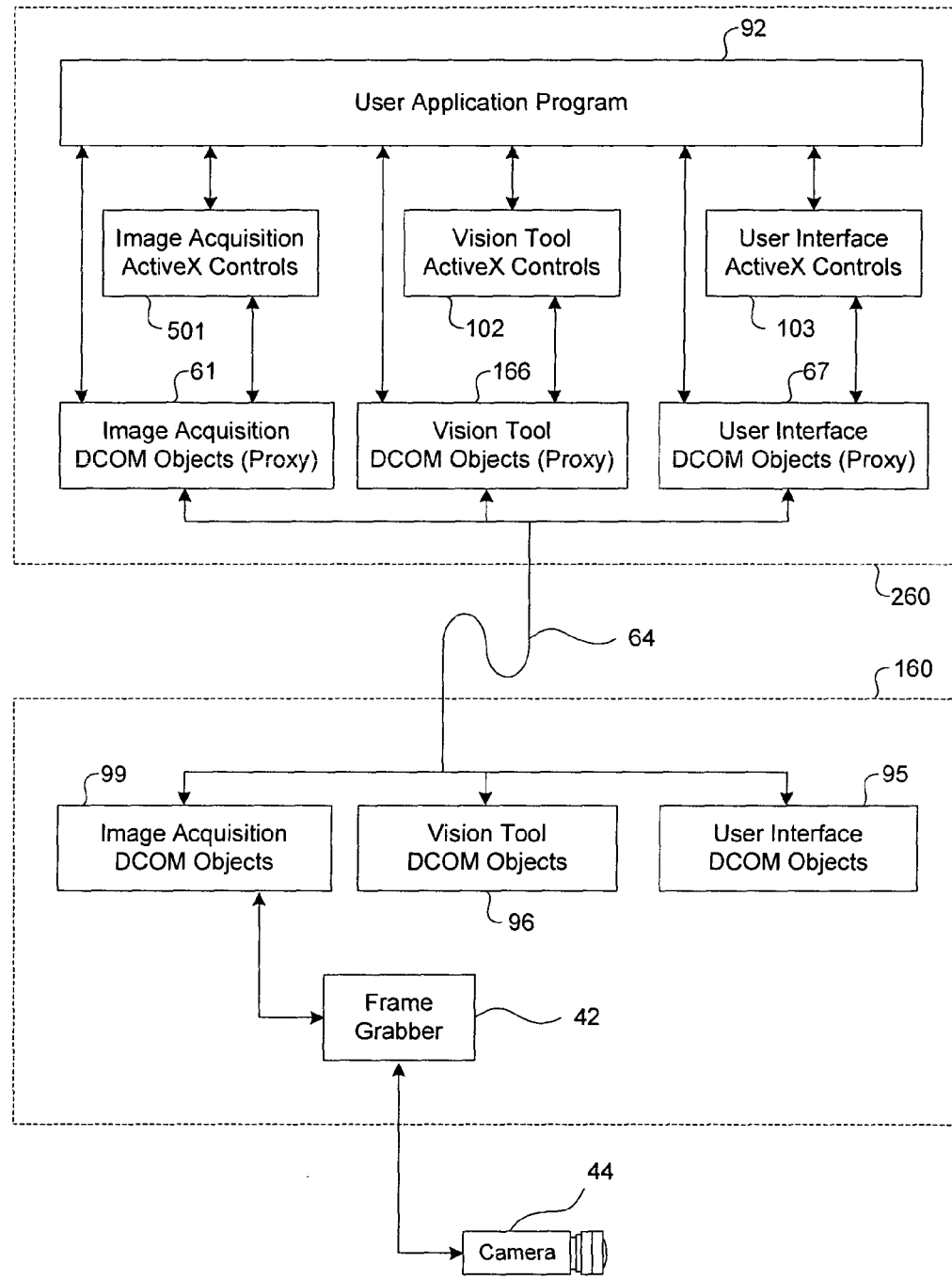
FIG. 10 is a diagram illustrating the deployment of the developed user application program in a second alternative, server mode, arrangement of FIG. 6.

As shown in FIG. 10, still other deployment arrangements are possible. In this third embodiment the machine vision system 60 is also located at two different places, and connected together in a server/client relationship via the network 64. The client machine vision portion 160 is located with the camera 44 coupled to the frame grabber 42. As illustrated in FIG. 10, the server machine vision portion 260 executes the developed user application program 92, however, the image acquisition objects 99, vision tool objects 96, and user interface objects 95 are executed on the client machine vision portion 160 through image acquisition DCOM proxy objects 61, vision tool DCOM proxy objects 166 and user interface DCOM proxy objects 67 on the machine vision server portion 260.

It should be apparent to those skilled in the art that many variations are possible from the preferred embodiments described above without departing from the spirit of the invention. Many different deployments of the compiled user application program 92 are possible.

For example, other computer systems may be used and different operating systems such as Unix may be used. Other object oriented programming environments and software component object standards such as JAVA developed by Sun Microsystems may be employed. While the Internet is the preferred network, other networks using different network protocols may be employed, or direct serial communications can be established using telephone lines. While most machine vision systems employ cameras, other sensors may also be used to acquire visible information. For example, a scanning electron microscope may be employed.

Further, the described embodiment makes use of COM, ActiveX, and DCOM technologies. These technologies shall not be viewed as limitations to the current invention, as they are merely exemplary embodiments to its implementation. Alternative embodiments include the use of different technologies. Specifically, the exemplary embodiment could be achieved using the Microsoft NET platform. Alternatively, the aforementioned ActiveX controls could be replaced with WindowsForm or WebForm controls and the DCOM standard could be replaced with the Simple Object Access Protocol (SOAP).

We claim:

1. A method for developing a user application program for a machine vision system having a sensor for acquiring information from a scene, the steps comprising:
   a) connecting the machine vision system to a network, the sensor being local to the machine vision system;
   b) connecting a program development system to the network at a location remote from the sensor location;
   c) developing an image acquisition section of the user application program at the program development system;
   d) testing and modifying the user application program while executing the image acquisition section of the user application program at the program development system to direct the machine vision system through the network to acquire scene information from the sensor and convey the scene information to the program development system through the network;
   e) developing an analysis section of the user application program at the program development system; and
   f) testing and modifying the user application program while executing the analysis section of the user application program at the program development system to analyze the scene information acquired from the sensor;
   g) deploying the compiled executable code as a user application program from the program development system to the machine vision system.

2. The method as recited in claim 1 which also includes:
   developing an image processing section of the user application program at the program development system; and
   executing an image processing section of the user application program at the program development system to modify scene information acquired from the sensor.

3. The method as recited in claim 1 which also includes developing a user interface section of the user application program at the program development system.

4. The method as recited in claim 1 in which the user application program is deployed by downloading the user application program through the network from the program development system to the machine vision system.

5. The method as recited in claim 4 in which a portion of the machine vision system is located near the sensor and connected thereto, and a portion of the machine vision system is located remotely from the sensor, the method further including;
   connecting the remote portion of the machine vision system and the local portion of the machine vision system to the network; and
   cooperatively linking the respective portions to the download user application program.

6. The method as recited in claim 5 in which the step of cooperatively linking the respective portions of the machine vision system is performed using at least one proxy software module stored at the remote portion of the machine vision system.

7. The method as recited in claim 5 in which the step of cooperatively linking the respective portions of the machine vision system is performed using at least one proxy software module stored at the local portion of the machine vision system.

8. The method as recited in claim 1 which includes:
   storing a first library of software modules at the machine vision system for providing image acquisition functions when a user application program is executed at the machine vision system or the program development system;
   storing a second library of software modules at the machine vision system for providing image analysis functions when a user application program is executed at the machine vision system; and
   wherein the deployment of the user application program in step g) enables the user application program to be executed at the machine vision system using the software modules in said libraries.

9. The method as recited in claim 8 in which the software modules comply with a component object standard.

10. The method as recited in claim 8 which includes storing a third library of software modules at the program development system for providing substantially the same image analysis functions of the second library of software modules when the user application program is executed at the program development system.

11. The method as recited in claim 10 in which step d) is performed using the software modules in the first library and the network which links the program development system to the machine vision system.

12. The method as recited in claim 11 which step d) is performed using proxy software modules stored at the program development system which correspond to software modules in the first library.

13. The method as recited in claim 12 in which the software modules in the first library comply with a component object standard.

14. A method for developing a user application program for a local machine vision system, the steps comprising:
   a) connecting the machine vision system to a network;
   b) connecting a program development system to the network at a location remote from the local machine vision system;
   c) producing a user application program with the program development system, the user application program including an image acquisition section that directs the local machine vision system to acquire scene information, conveying the scene information to the program development system through the network, and testing and modifying the user application program while executing the image acquisition section of the user application program;

d) deploying the user application program by downloading it to the machine vision system through the network; and e) executing the user application program on the machine vision system.

15. The method as recited in claim 14 which includes:

storing a first library of software modules at the machine vision system;

storing a second library of software modules at the program development system which includes software modules substantially the same as those stored in the first library; and wherein step c) is performed using software modules in said second library; and the deployed user application program is executed on the machine vision system by using corresponding software modules in the first library.

16. The method as recited in claim 15 in which the software modules in the first and second libraries comply with a component object standard.

17. The method as recited in claim 14 in which a camera is coupled to the machine vision system and the method includes:

e) executing the user application program at the program development system to acquire an image using the camera and convey the image through the network to the program development system; and f) executing the user application program at the program development system to analyze said acquired image.

18. The method as recited in claim 14 which includes:

storing image acquisition software modules at the machine vision system which direct the camera to acquire an image; and step e) includes:

executing the stored image acquisition software modules under the direction of the user application program executing at the program development system through the network.

19. The method as recited in claim 18 in which the image acquisition software modules comply with an object component standard.

20. The method as recited in claim 18 which includes storing image analysis software modules at the program development system for use by the user application program in performing step f).

21. The method as recited in claim 20 which includes storing image analysis software modules at the machine vision system for use by the user application program in performing step e).

22. The method as recited in claim 14 in which the network is the Internet and steps a) and b) include executing programs at the respective machine vision system and program development system which establish an Internet Protocol (IP) network connection and a Transmission Control Protocol (TCP) transport service between the machine vision system and the program development system.

23. A method for developing a user application program for a machine vision system having a sensor for acquiring information from a scene, the steps comprising:

a) connecting the machine vision system to a network, the sensor local to the machine vision system, the network having a capability to communicate information;

b) connecting a program development system to the network at a location remote from the sensor location;

c) developing an image acquisition section of the user application program at the program development system;

d) testing and modifying the user application program while executing the image acquisition section of the user application program at the program development system to direct the machine vision system through the network to acquire scene information from the sensor and convey the scene information to the program development system through the network; and e) deploying the user application program from the development system to the machine vision system.

24. The method as recited in claim 23 which also includes developing an image processing section of the user application program.

25. The method as recited in claim 24 which also includes developing an image analysis section of the user application program.

26. The method as recited in claim 25 which also includes developing a user interface section of the user application program.

27. The method as recited in claim 24 which also includes developing a user interface section of the user application program.

28. The method as recited in claim 23 which also includes developing an image analysis section of the user application program.

29. The method as recited in claim 23 which also includes developing a user interface section of the user application program.

30. The method as recited in claim 23 wherein the program development system is a simple script engine.

31. The method as recited in claim 23 wherein the program development system is a development environment.

32. The method as recited in claim 23 wherein the network is a physical hardwired network.

33. The method as recited in claim 23 wherein the network is a wireless network.

* * * * *